Feb. 21, 1950  B. M. WOJCIECHOWSKI  2,498,103
DIFFERENTIAL DETECTOR
Filed Feb. 16, 1949

INVENTOR
B. M. WOJCIECHOWSKI
BY
Walter M. Hill
ATTORNEY

Patented Feb. 21, 1950

2,498,103

UNITED STATES PATENT OFFICE 2,498,103

DIFFERENTIAL DETECTOR

Bogumil M. Wojciechowski, New York, N. Y., assignor to Western Electric Company, Incorporated, New York, N. Y., a corporation of New York Application February 16, 1949, Serial No. 76,734

5 Claims. (Cl. 177—311)

This invention relates to electrical measuring devices and more particularly to a differential detector of high sensitivity.

In the use of highly sensitive differential detectors, as for example in connection with detecting the unbalanced voltage from an electric bridge or the null voltage from a potentiometer circuit, considerable annoyance is created by unsteadiness of the null indicator due to spurious "noise" voltages which have no particular relation whatever with the quantities being measured. A considerable variety of null indicators have been devised and used and among these one of the more sensitive null indicators for use with electric bridges and potentiometer circuits is the balanced direct-current vacuum tube amplifier circuit. The basic circuit to which this invention has been applied is commonly known as a balanced or compensated vacuum tube voltmeter circuit. When such instruments are made very sensitive, stray or spurious voltages, known as "noise" voltages, cause an unsteadiness of the galvanometer pointer. This is a source of considerable annoyance to anyone using the equipment.

It is the object of this invention to overcome the aforesaid annoying condition and stabilize the pointer of the galvanometer during substantial null conditions when no appreciable signal voltage is being received by the indicating circuit.

The foregoing object is achieved by this invention which provides an indicator circuit for a balanced differential detector wherein is included two pairs of unilateral conductive elements, such as, for example, rectifiers. A small bias voltage is applied to each of these two pairs of elements to render their resistances normally very high. The current responsive indicator is connected to this balanced detector circuit through these elements so that upon receiving a voltage to be detected the small bias voltages are overcome and the voltage is indicated by the current indicator. The adjustments are so made that the "noise" voltages are too small to overcome the bias voltage.

Figure 1:
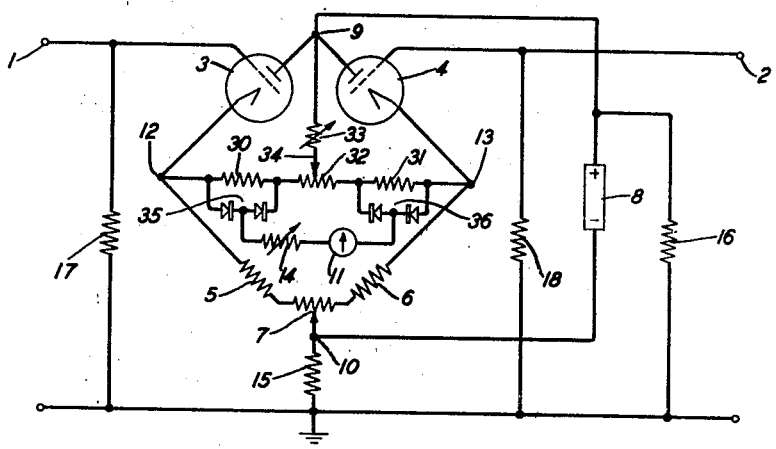
Figure 2:
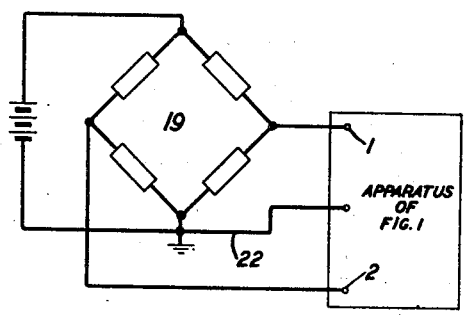
Figure 3:
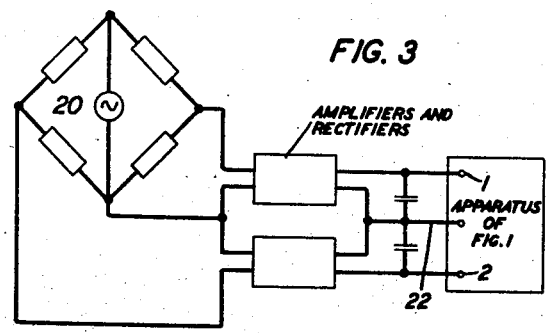
Figure 4:
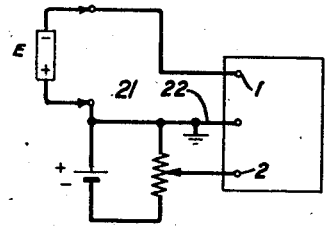

The invention may be better understood by referring to the accompanying drawings in which:

Fig. 1 discloses an embodiment of the invention in a well-known type of balanced direct-current vacuum tube voltmeter circuit which is frequently used as a null indicator;

Fig. 2 discloses the invention as applied to a Wheatstone bridge with direct voltage input;

Fig. 3 shows the application of the invention to the null indication of an alternating-current bridge; and Fig. 4 shows the invention applied to a simple potentiometer circuit of the type frequently used for measuring electromotive forces.

Referring now to Fig. 1, it will be noted that the detector circuit has two input terminals 1 and 2, respectively, and that these two terminals, together with the common or ground terminals, constitute two pairs of input terminals to the differential detector. Two vacuum tubes 3 and 4, herein disclosed as simple triodes, together with preferably equal resistors 5 and 6 and a potentiometer 7, comprise the basic elements of the balanced direct-current vacuum tube voltmeter circuit of conventional type. A direct voltage is applied to this network from source 8 through terminals 9 and 10 and a conventional galvanometer, such as galvanometer 11 is connected to terminals 12 and 13 usually through a variable resistance, such as rheostat 14. Conventionally, this connection is usually made directly to terminals 12 and 13, the intervening apparatus in Fig. 1 constituting structure of this invention. The large bias drop normally occurring in cathode resistors 5 and 6 is offset by current from source 8 through resistor 15 by way of resistor 16. As is well known, this will bring the normal no-signal bias of the two grids to their required operating points. Grid resistors 17 and 18 may be provided if no direct-current path is provided by the apparatus to which terminals 1 and 2 are connected.

The apparatus so far described will be recognized as quite conventional. In the use of such a circuit, considerable unsteadiness of the indicator pointer is often observed during substantial null conditions. As these instruments are necessarily quite sensitive, this condition is very annoying. The noise voltages which cause this unsteadiness may not only come from the apparatus to which the differential detector circuit is connected, but may also originate in part in the circuit of the differential detector itself. In accordance with this invention this condition is eliminated by connecting two substantially equal resistors 30 and 31 in series with a potentiometer 32 to the amplifier terminals 12 and 13. Two pairs of unilateral conducting elements 35 and 36 are connected across resistors 30 and 31. The elements of each of the pairs should be poled in the same direction and the two pairs should be poled in opposite directions as shown. It is obvious that the polarities of the two pairs may be reversed if the direction of the biasing voltage is also reversed. These unilateral elements may comprise copper oxide rectifiers, selenium rectifiers, thermionic diodes or any other type of unilateral conducting element which, when polarized in one direction with a direct voltage, will exhibit a very high resistance, whereas in the so-called "forward" direction the resistance becomes relatively low.

The bias voltage is applied to each of these pairs of unilateral conductors by means of the voltage drop across resistors 30 and 31 due to a current flowing from source 8 through resistor 33, then in opposite directions from slider 34 through resistor 32 and resistors 30 and 31 back to source 8 through an obvious path. The magnitude of this bias voltage is adjusted by adjusting the resistance of resistor 33 and equality in its effect on the two pairs of elements is provided by adjusting slider 34 on potentiometer 32. The bias voltage thus produced is of such polarity that the unilateral elements are biased in their reverse direction so as to exhibit a very high resistance. The effect is that galvanometer 11 is connected to terminals 12 and 13 through very high resistances and is therefore essentially disconnected in so far as its ability to respond to unbalanced voltages of noise level is concerned.

When an appreciable signal voltage is received, it results in an unbalanced voltage between terminals 12 and 13 which, when appreciably higher than the noise level adjusted for, will overcome the bias voltages in resistors 30 and 31 and permit current to flow through the unilateral elements 35 and 36 to the galvanometer 11. For example, assume that the signal voltage is of such polarity that terminal 12 of the amplifier is at a potential higher than terminal 13. Current will flow through resistors 30, 32 and 31, the current through resistor 30 being larger and opposite to the bias current provided through resistor 33. This overcomes the bias on unilateral elements 35 whereby the galvanometer 11 is connected to terminal 12 through a relatively low impedance path. While the bias voltage due to the drop in resistor 31 has been somewhat increased on element 36, nevertheless due to the fact that galvanometer 11 is now essentially connected to terminal 12, the potential at the junction between the two unilateral elements 36 tends to be of the same potential as terminal 12. This produces a larger bias voltage in the forward direction on the unilateral element connected between galvanometer 11 and the junction between resistors 31 and 32, thereby lowering the resistance of this element and permitting current to flow through the galvanometer, through this element, through resistor 31 and to terminal 13. Since this circuit is symmetrical, the same action will be observed when terminal 13 is of higher potential than terminal 12 due to a signal voltage of opposite polarity being received by the differential detector.

It will be observed that this biasing arrangement is somewhat different from the usual limiter circuit in that the unilateral elements do not shunt the input circuit to the indicator 11 nor do they lower its sensitivity at high signal levels.

The differential detector circuit shown in Fig. 1 is connected to bridge and potentiometer circuits in a conventional manner. However, for the sake of completeness the invention has been shown connected to such circuits in Figs. 2, 3 and 4.

In Fig. 2 bridge 19 may be a conventional Wheatstone bridge supplied by direct current. The common terminal of the differential detector of Fig. 1 is connected by conductor 22 to the ground terminal of bridge 19 which is preferably one of the input terminals of that bridge. The two output terminals of bridge 19 are then connected to terminals 1 and 2 of the differential detector. The operation of the apparatus of Fig. 1 in connection with this bridge circuit is obvious from the description already given of Fig. 1.

In Fig. 3 the invention is disclosed in connection with an alternating-current bridge 20. Since this differential detector responds only to differences in direct potential the alternating voltage output from bridge 20 must be first rectified. In most alternating-current bridge applications this voltage is also amplified before rectification but the connections to such a balanced amplifier and rectifier are so conventional that they require no description beyond the block diagram shown in Fig. 3. Such circuits are exemplified by United States Patent 1,369,403 granted February 22, 1921, to C. S. Demarest and H. F. Shoffstall. It will be seen that the alternating voltage output from the bridge 20 is amplified and rectified and the direct voltage from the rectifier is applied to the terminals 1 and 2 and the common terminal of the differential detector of Fig. 1.

In Fig. 4, the invention is shown applied to a potentiometer circuit commonly used for measuring electromotive forces. Such a circuit is shown in United States Patent 1,232,879 granted July 10, 1917, to P. I. Wold. In such an arrangement the null condition is obtained when the potentials at terminals 1 and 2 of the differential indicator are equal with respect to the common or ground terminal.

It should be understood that the applications of this invention as shown in Figs. 2, 3 and 4, respectively, are illustrative only and should not be regarded as restrictive in any sense. As has been previously stated, this invention may be applied to any differential indicator of the general type shown in Fig. 1. Also, while the common terminal of the detector has been shown connected by a conductor 22 to the bridge or potentiometer circuit, it may be omitted in many cases without impairing the operativeness of the circuit. It is also possible in some cases to connect the galvanometer network of Fig. 1 directly to the bridge or other balanceable network without using the direct-current amplifier. A separate source may supply the bias current through resistor 33. These and other obvious modifications are to be considered equivalents within the scope of this inventon as defined by the appended claims.

What is claimed is:

1. A differential detector for a balanceable network with input and output terminals, a current responsive indicator, two pairs of unilateral conducting elements, the two elements of each pair being connected in series, a resistor connected across each of said pairs, a third resistor connected between the first two to form a series network of the three resistors, circuits connecting said series network of resistors to the output terminals of the balanceable network, circuits connecting the indicator to the connection between the unilateral conducting elements of each pair, and means connected to a point in said third resistor for providing a flow of direct current therein in opposite directions from said point, whereby said unilateral elements are biased to prevent flow of low magnitude currents through the indicator but readily permits current of predetermined higher magnitude to flow.

2. The combination in accordance with claim 1 wherein the circuits connecting said series network of resistors to the output terminals of the balanceable network comprises a balanced direct-current amplifier circuit with input and output circuits, circuits connecting said amplifier input circuits to said output terminals and other circuits connecting the series network of resistors to the amplifier output circuit.

3. A differential detector for a balanceable network having input and output terminals, said detector comprising a first pair of unilateral conducting elements connected in series relation, a second pair of unilateral conducting elements also connected in series relation, a resistor shunting each of said pairs, a potentiometer with resistor element and slider, the resistor element whereof is connected between said two shunting resistors to form a series network of the three resistors, circuit means for coupling said series network to the output terminals of the balanceable network, a current responsive indicator connected to the junction between the unilateral conducting elements of each pair, and means connected to said slider for providing a flow of direct current through the potentiometer resistor element in opposite directions from the slider whereby said unilateral elements are biased to prevent flow of low magnitude current through the indicator but readily permits current of predetermined higher magnitude to flow.

4. The combination of claim 3 wherein said circuit means for coupling the series network to the output terminals of said balanceable network comprises a balanced direct-current amplifier.

5. The combination of claim 4 wherein said direct-current amplifier comprises two vacuum tubes with input and output electrodes, a resistor connected to form a series circuit with the output electrodes of one tube, another resistor forming a similar circuit with the other tube, a source of direct current, circuits connecting said two series circuits in parallel with said source, circuits connecting the input electrodes of said tubes to the output terminals of said balanceable network, and other circuits connecting the said series network of three resistors between an output electrode of one of the tubes and the similar electrode of the other tube.

BOGUMIL M. WOJCIECHOWSKI.

REFERENCES CITED

The following references are of record in the file of this patent:

UNITED STATES PATENTS

| Number | Name | Date |
| --- | --- | --- |
| 1,948,238 | Prince | Feb. 20, 1934 |
| 2,272,849 | Perkins | Feb. 10, 1942 |
| 2,431,915 | Burchfield | Dec. 2, 1947 |